United States Patent
Schulz et al.

(10) Patent No.: US 6,549,995 B1
(45) Date of Patent: Apr. 15, 2003

(54) COMPRESSOR SYSTEM MEMORY ORGANIZATION AND METHOD FOR LOW LATENCY ACCESS TO UNCOMPRESSED MEMORY REGIONS

(75) Inventors: Charles O. Schulz, Ridgefield, CT (US); T. Basil Smith, III, Wilton, CT (US); Robert B. Tremaine, Stormville, NY (US); Michael Wazlowski, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/478,557

(22) Filed: Jan. 6, 2000

(51) Int. Cl.[7] ................................................. G06F 12/00

(52) U.S. Cl. .................. 711/202; 711/206; 711/208; 711/170; 711/173; 710/68

(58) Field of Search ................................ 711/170, 171, 711/172, 173, 202, 203, 206, 207, 208; 710/68

(56) References Cited

U.S. PATENT DOCUMENTS

| | | | | | |
|---|---|---|---|---|---|
| 5,459,849 | A | * | 10/1995 | Bergkvist, Jr. et al. | 711/3 |
| 5,490,260 | A | | 2/1996 | Miller et al. | 711/173 |
| 5,699,539 | A | * | 12/1997 | Garber et al. | 711/2 |
| 5,794,049 | A | * | 8/1998 | Lindholm | 717/6 |
| 5,812,817 | A | | 9/1998 | Hovis et al. | 711/100 |
| 5,960,465 | A | * | 9/1999 | Adams | 711/208 |
| 6,092,172 | A | * | 7/2000 | Nishimoto et al. | 711/207 |

* cited by examiner

Primary Examiner—Hong Kim
(74) Attorney, Agent, or Firm—Scully, Scott, Murphy & Presser; Daniel P. Morris, Esq.

(57) ABSTRACT

In a processing system having a main memory wherein information is stored in a compressed format for the purpose of gaining additional storage through compression efficiencies and, wherein information stored within the main memory is indirectly accessible by a processor through a compression and decompression mechanisms, an improved memory architecture that accommodates the necessary compressed information data structures, together with a memory region and mapping method for storing information that bypasses the compression and decompression mechanisms to provide low latency processor access to certain address spaces.

19 Claims, 6 Drawing Sheets

COMPRESSOR SYSTEM MEMORY ORGANIZATION AND METHOD FOR LOW LATENCY ACCESS TO UNCOMPRESSED MEMORY REGIONS

BACKGROUND OF THE INVENTION

1. Field of the Invention

This invention relates in general to the field of memory management and memory system architectures in computer systems, and more specifically, to the organization of the address space around specific compressed memory data structures and a method and apparatus for managing the access to the memory.

2. Discussion of the Prior Art

Computer systems generally consist of one or more processors that execute program instructions stored within a memory medium. This mass storage medium is most often constructed of the lowest cost per bit, yet slowest storage technology, typically magnetic or optical media. To increase the system performance, a higher speed, yet smaller and more costly memory, known as the main memory, is first loaded with information from the mass storage for more efficient direct access by the processors.

Recently, cost reduced computer system architectures have been developed that more than double the effective size of the main memory by employing high speed compression/decompression hardware, based of common compression algorithms, in the path of information flow to and from the main memory. Processor access to main memory within these systems is performed indirectly through the compressor and decompressor apparatuses, both of which add significantly to the processor access latency costs.

Referring now to FIG. 1, a block diagram of a prior art computer system 100 is shown. The computer system includes one or more processors 101 connected to a common shared memory controller 102 that provides access to a system main memory 103. The shared memory controller contains a compressor 104 for compressing fixed size information blocks into as small a unit as possible for ultimate storage into the main memory, a decompressor 105 for reversing the compression operation after the stored information is later retrieved from the main memory. The processor data bus 108 is used for transporting uncompressed information between other processors and/or the shared memory controller. Information may be transferred to the processor data bus 108 from the main memory 103, either through or around the decompressor 105 via a multiplexor 111. Similarly, information may be transferred to the main memory 103 from the processor data bus 108 to the write buffer and then either through or around the compressor 104 via a multiplexor 112.

The main memory 103 is typically constructed of dynamic random access memory (DRAM) with access controlled by a memory controller 106. Scrub control hardware within the memory controller can periodically and sequentially read and write DRAM content through error detection and correction logic for the purpose of detecting and correcting bit errors that tend to accumulate in the DRAM. Addresses appearing on the processor address bus 107 are known as Real Addresses, and are understood and known to the programming environment. Addresses appearing on the main memory address bus 109 are known as Physical Addresses, and are used and relevant only between the memory controller and main memory DRAM. Memory Management Unit (MMU) hardware within the memory controller 106 is used to translate the real processor addresses to the virtual physical address space. This translation provides a means to allocate the physical memory in small increments for the purpose of efficiently storing and retrieving compressed and hence, variable size information.

The compressor 104 operates on a fixed size block of information, say 1024 bytes, by locating and replacing repeated byte strings within the block with a pointer to the first instance of a given string, and encoding the result according to a protocol. This scheme results in a variable size output block, ranging from just a few bytes to the original block size, when the compressor could not sufficiently reduce the starting block size to warrant compressing at all. The decompressor 105 functions by reversing the compressor operation by decoding resultant compressor output block to reconstruct the original information block by inserting byte strings back into the block at the position indicated by the noted pointers. Even in the very best circumstances, the compressor is generally capable of only ¼–½ the data rate bandwidth of the surrounding system. The compression and decompression processes are naturally linear and serial too, implying quite lengthy memory access latencies through the hardware.

Referring to FIG. 2, there is shown a conventional partitioning scheme 200 for the main memory 103 (FIG. 1). The main memory 205 is a logical entity because it includes the processor(s) information as well as all the required data structures necessary to access the information. The logical main memory 205 is physically partitioned from the physical memory address space 206. In many cases the main memory partition 205 is smaller than the available physical memory to provide a separate region to serve as a cache with either an integral directory, or one that is implemented externally 212. It should be noted that when implemented, the cache storage may be implemented as a region 201 of the physical memory 206, a managed quantity of uncompressed sectors, or as a separate storage array. In any case, when implemented, the cache controller will request accesses to the main memory in a similar manner as a processor would if the cache were not present. Although it is typical for a large cache to be implemented between the processor(s) and main memory for the highest performance, it is not required, and is beyond the scope of the invention.

The logical main memory 205 is partitioned into the sector translation table 202, with the remaining memory being allocated to sector storage 203 which may contain compressed, uncompressed, free sector pointers, or any other information as long as it is organized into sectors 204. The sector translation table region size varies in proportion to the real address space size which is defined by a programmable register within the system.

Particularly, equation 1) governs the relation of the sector translation table region size as follows:

$$\text{sector\_translation\_table\_size} = \frac{\text{real\_memory\_size}}{\text{compression\_block\_size}} \cdot \text{translation\_table\_entry\_size} \quad 1)$$

Each entry is directly mapped to a fixed address range in the processor's real address space, the request address being governed in accordance with equation 2) as follows:

$$\text{STT\_entry\_address} = \left(\left(\frac{\text{real\_address}}{\text{compression\_block\_size}}\right) \cdot \text{translation\_table\_entry\_size}\right) + \text{cache\_region\_size} \quad 2)$$

For example, a mapping may employ a 16 byte translation table entry to relocate a 1024 byte real addressed compression block, allocated as a quantity 256 byte sectors, each located at the physical memory address indicated by a 25-bit pointer stored within the table entry. The entry also contains attribute bits 208 that indicate the number of sector pointers that are valid, size, and possibly other information.

Every real address reference to the main memory causes memory controller to reference the translation table entry 207 corresponding to the real address block containing the request address. For read requests, the MMU decodes the attribute bits 208, extracts the valid pointer(s) 209 and requests the memory controller to read the information located at the indicated sectors 204 from the main memory sectored region 203. Similarly, write requests result in the MMU and memory controller performing the same actions, except information is written to the main memory. However, if a write request requires more sectors than are already valid in the translation table entry, then additional sectors need to be assigned to the table entry before the write may commence. Sectors are generally allocated from a list of unused sectors that is dynamically maintained as a stack or linked list of pointers stored in unused sectors. There are many possible variations on this translation scheme, but all involve a region of main memory mapped as a sector translation table and a region of memory mapped as sectors. Storage of these data structures in the DRAM based main memory provides the highest performance at the lowest cost, as well as ease of reverting the memory system into a typical direct mapped memory without compression and translation.

Large high speed cache memories are implemented between the processor and the compressor and decompressor hardware to reduce the frequency of processor references to the compressed memory to mitigate the effects the high compression/decompression latency. However, system performance can be further improved for certain memory access patterns and/or information structures that are insensitive to the benefits of the large cache. Therefore, the need has arisen for an improved method of information storage and access without significant cost or complexity, to minimize processor access latencies under certain conditions.

Computer systems that employ main memory compression achieve performance benefits when certain memory regions are segregated from the compressed memory and always remain uncompressed. This performance advantage results from the considerably lower access latency when memory references bypass the compression and decompression hardware and related address translation. Segregated regions may be implemented by simply defining regions where compression is disabled, but data is still stored in the compressed memory sectors, requiring a reference to a Sector Translation Table (STT) before an access may be serviced. Even cache structures that employ high speed directories are performance disadvantaged by the cache replacement overhead and algorithm, as well as the directory access overhead.

SUMMARY OF THE INVENTION

It is an object of the invention to provide a computer memory management system and methodology for partitioning a fixed size physical memory into regions including a relocated direct mapped uncompressed region that requires no Sector Translation Table (STT) or directory reference to service a processor access, thereby reducing memory latency to a minimum and fixed latency.

It is a further object of the invention to provide a method and apparatus for enabling user configuration of a computer main memory system into unique, logical partitions including a STT table region, an unsectored memory region and a sectored memory region of variable sizes.

It is another object of the invention to provide a computer memory system that comprises unique, logically partitioned regions including a STT table region, an unsectored memory region and a sectored memory region of variable sizes that is user configurable, whereby STT table entries map into sectored memory space in the sectored memory region and additional sectored memory space is extracted from the STT region at locations corresponding to locations allocated in the unsectored memory region.

According to the invention, there is provided a system and method for managing and logically partitioning physical main memory into three regions; the Sector Translation Table (STT), sectored memory, and uncompressed memory. These three regions are unified together to form a mapped memory available to the memory controller. The mapped memory space can "float" between the most significant SDRAM byte address (top) and the least significant SDRAM byte address (bottom) of the memory, as defined by Physical Memory Configuration Register(s). The physical memory is completely remapped (virtualized) from the real address space defined at the processor interface. The STT serves as the directory for the remapping of the compressed data. The uncompressed regions of real memory, defined by Compression Inhibit Range Register(s), are direct mapped into the uncompressed memory region of physical memory. These registers are configured by a system processor at system startup, and remain static throughout system operation.

The memory mapping scheme of the invention permits the STT and uncompressed memory regions to be referenced at an origin address at the logical bottom and top of the physical memory map, leaving the region between allocated regions as sectored memory. These regions may expand or contract depending on the memory configuration established by the user. With respect to the STT, as the addresses of memory locations within the unsectored memory region never use any sectors, then the direct mapped sector translation table entries represent "holes" within the table that are not used. These holes within the sector translation table may be used as additional sector storage for increases memory utilization. These locations are made available by placing the addresses to the storage on a sector free list at system start-up.

Advantageously, the system of the invention permits computers to be constructed with hardware compressed memory systems without wasted memory or the side effects of high and variable latency access to critical memory references, for example; video, translation tables, BIOS, device driver, or interrupt service program code or data.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 3:
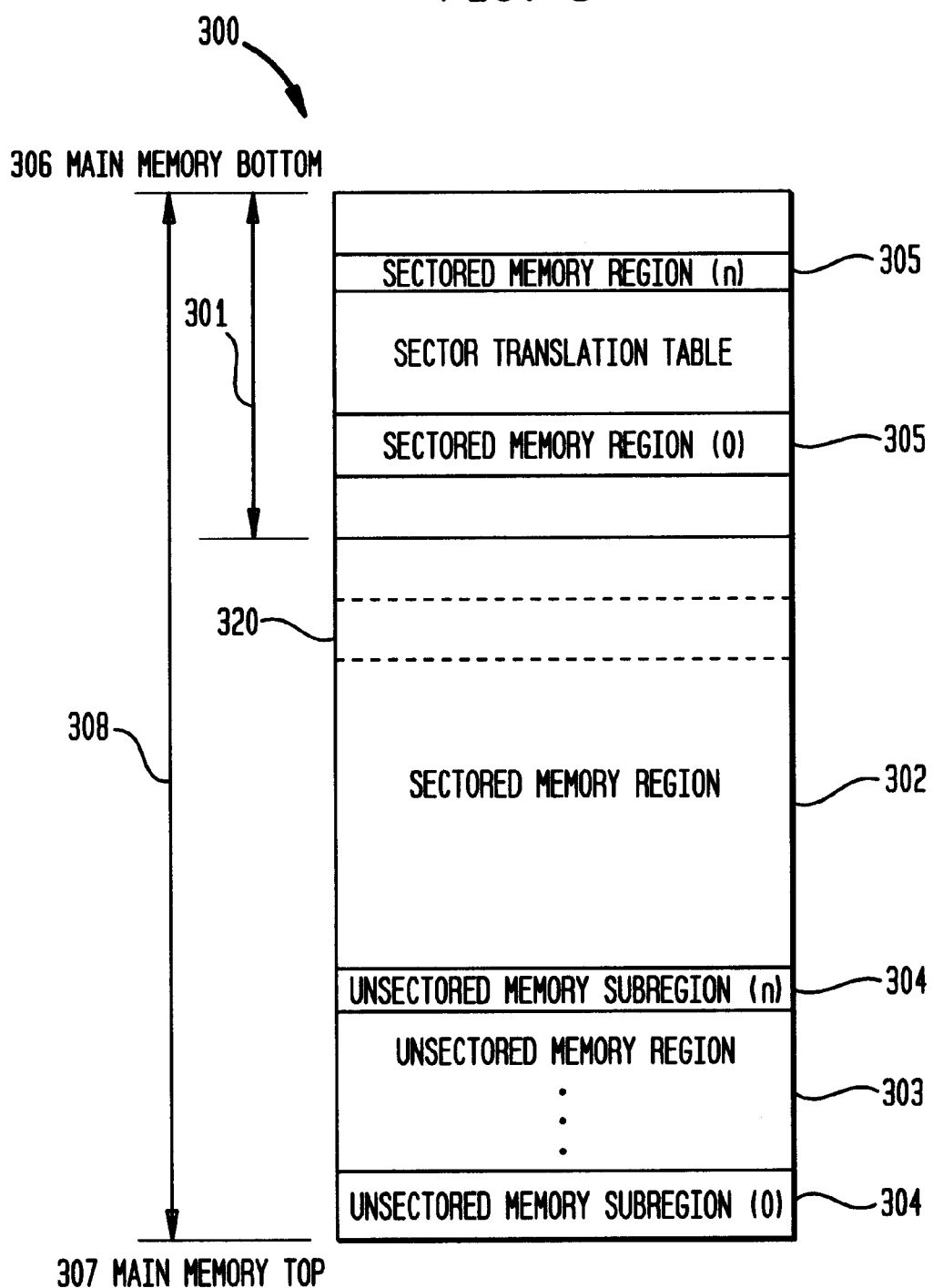
FIG. 3 illustrates the memory address space partitioning according to the principals of the present invention.

FIG. 3 illustrates an improved main memory partitioning scheme 300 that incorporates a new mapped region 303 for high speed access to redirect mapped and unsectored information. The unsectored memory 303 region is a composite of a number of independent variable but static size sub-regions 304. The corresponding real address ranges are directly mapped to the physical memory addresses, permitting the processor(s) directly access stored information without referencing the sector translation table. Information within the unsectored range is never compressed and may be accessed at a smaller granularity than required for accesses to information stored with the sectored memory region. The unsectored memory region 303 begins at the top 307 of the logical main memory and extends toward the bottom 306 and the sector translation table region 301 begins at the bottom 306 and extends towards the logical memory top 307. The memory between the two regions is defined as the sectored memory region 302. Since addresses contained within the unsectored memory region 303 never use sectors, then the corresponding direct mapped sector translation table entries 305 represent holes within the table 301 that are not used. According to the invention, these holes within the sector translation table are used as additional sector storage 305, where a sectored memory sub region 305 exists within the sector translation table 301 region for every corresponding sub-region 304 within the unsectored memory region 303. The additional sector storage is made available by placing addresses to the storage on the sector free list 320 at system start up. As shown in FIG. 3, this sector free list resides in sectored memory region 302, however, may reside in a separate memory accessible by the memory controller.

Figure 1:
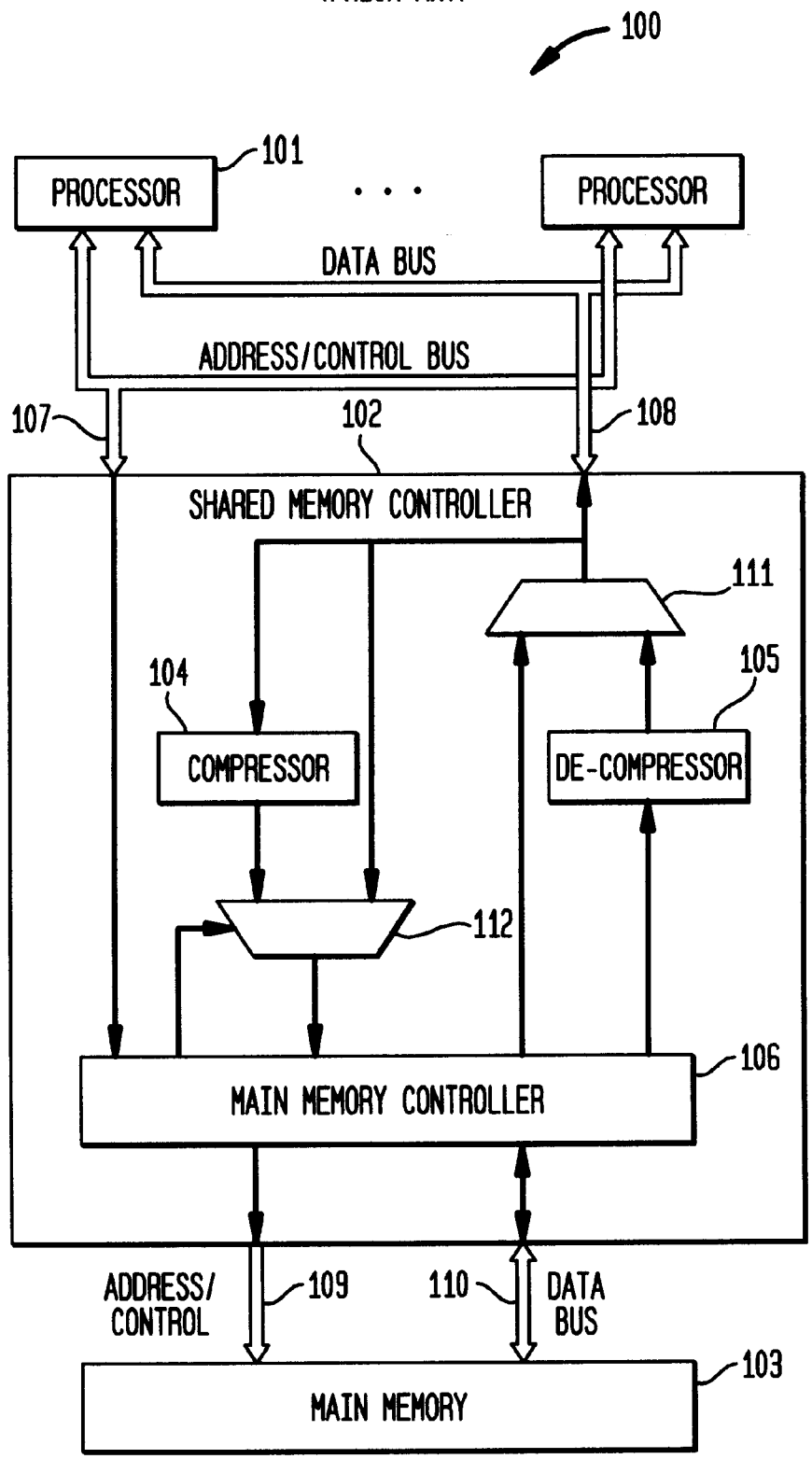
FIG. 1 illustrates a block diagram of a prior art computer having a memory system with hardware compressor and decompressor.
Figure 4:
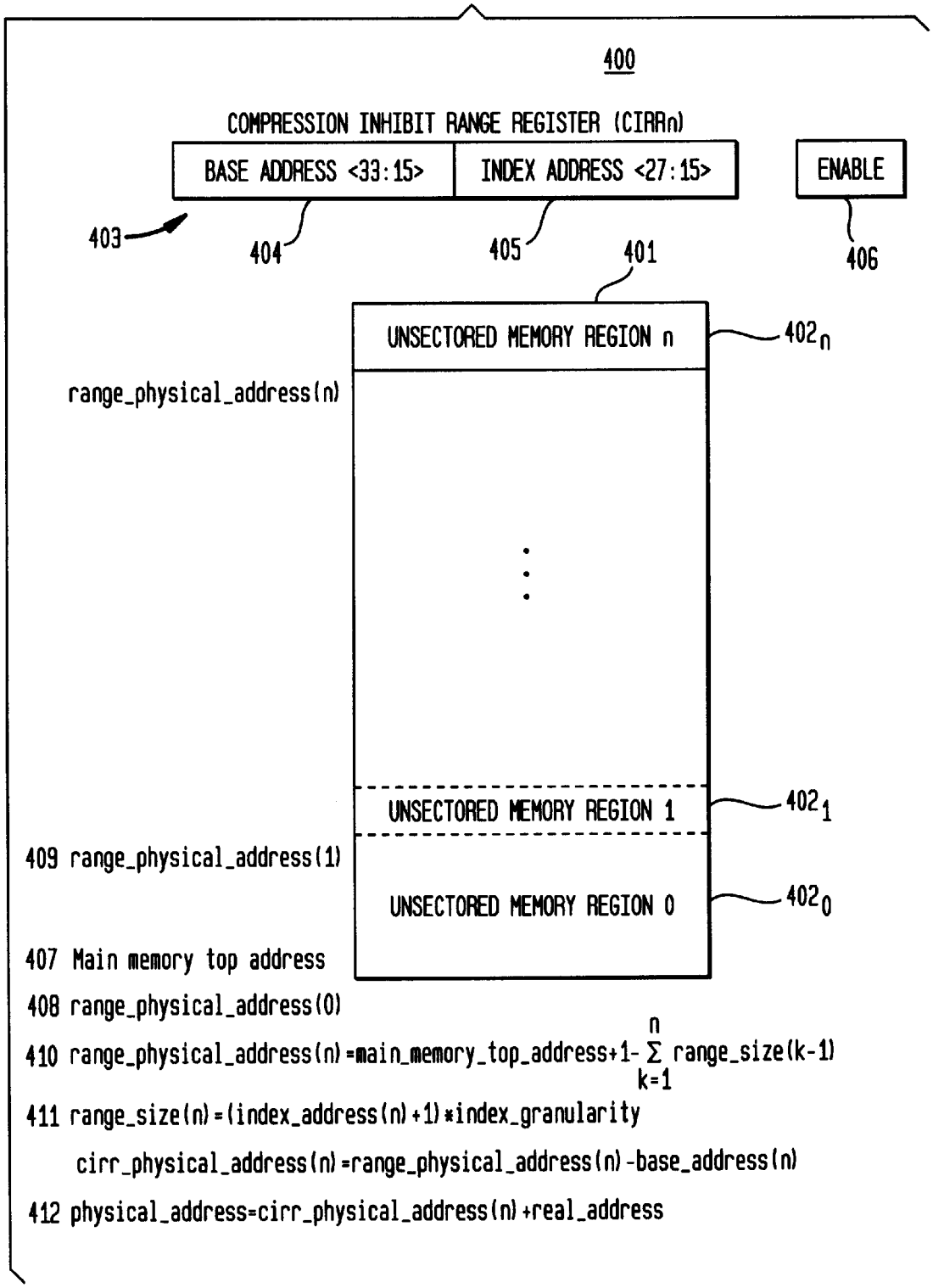
FIG. 4 illustrates the apparatus and method for configuring a redirect mapped uncompressed storage region.

Referring now to FIG. 4, there is illustrated an apparatus and method 400 for implementing an unsectored direct mapped address region within the main memory. The unsectored memory region 401 is a composite of a number (n) of independent variable but static size sub-regions $402_0$, $402_1$, ..., $402_n$, with each sub-region ranging in size from zero to some maximum number of bytes, by a fixed granularity. The size (range_size(n)) of each unsectored memory sub-region n, i.e., $402_0$, $402_1$, ..., $402_n$, is governed according to equation 3) as follows:

$$range\_size(n) = (index\_address(n)+1) * index\_granularity \quad 3)$$

where the index granularity represents the incremental fixed size amount e.g., 256 bytes, by which a sub-region may grow, and the index address defines the extent of the sub-region. In the preferred embodiment, each unsectored memory sub-region $402_0$, $402_1$, ..., $402_n$ is defined by a corresponding Compression Inhibit Range Register (CIRR) $403_0$, $403_1$, ..., $403_n$ one of which 403 is shown in FIG. 4 and which is included as part of the main memory controller (FIG. 1). Each CIRR 403 contains a bit vector 404 for storing a base address defining the beginning address of an unsectored memory sub-region at a given granularity (for example, 32K bytes within a 16 G byte real address space), a bit vector 405 for storing an index address defining the region end within a maximum extent (for example, 32K byte within 256 M bytes) from the start address, and, an associated enable bit 406. As shown in FIG. 4, the first unsectored subregion $402_0$ always begins at the logical top of the main memory 401, at a fixed address referred to herein as range_physical_address(0) (=main_memory_top_address), and extends toward the logical bottom of the main memory by a length defined by lowest order CIRR. This length is defined according to equation 4) and 5) as follows:

$$CIRR\_Physical\_address(n) = range\_physical\_address(n) - base\_address(n) \quad 4)$$

where $$range\_physical\_address(n) = \quad 5)$$

$$main\_memory\_top\_address + 1 - \sum_{k=1}^{n} range\_size(k-1)$$

where the range_size(n) is governed in accordance with equation 3). It follows that the second unsectored subregion 409 begins at range_physical_address(1) after the end of the first region $402_0$ and extends toward the logical bottom of the main memory by the length defined by next lowest CIRR. This sequence continues until all enabled CIRR's are accommodated.

Figure 2:
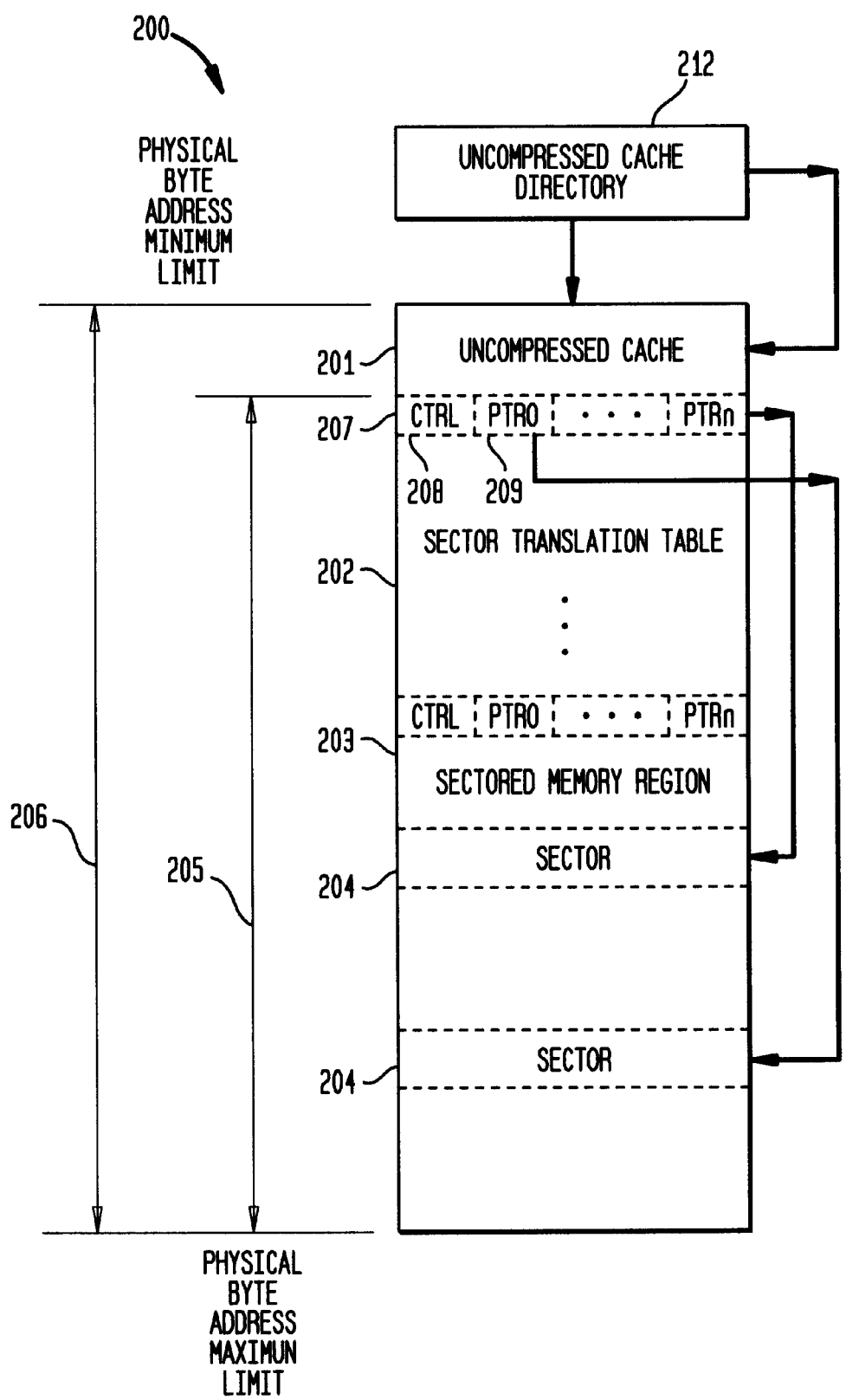
FIG. 2 illustrates prior art for a memory address space partitioning.

It should be understood that when a CIRR enable bit 406 is not set, no corresponding uncompressed memory region is partitioned. However, when a CIRR enable bit 406 is set, any sector translation table entry addresses selected 210 (FIG. 2) by the CIRR real address range are added to the sector free list. If no CIRR enable bits are set, then the unsectored memory region is of size zero, the sectored region extends to the top of the main memory, and no holes exist within the sector translation table. Thus, no memory is wasted or left unused for this scheme.

Figure 5A:
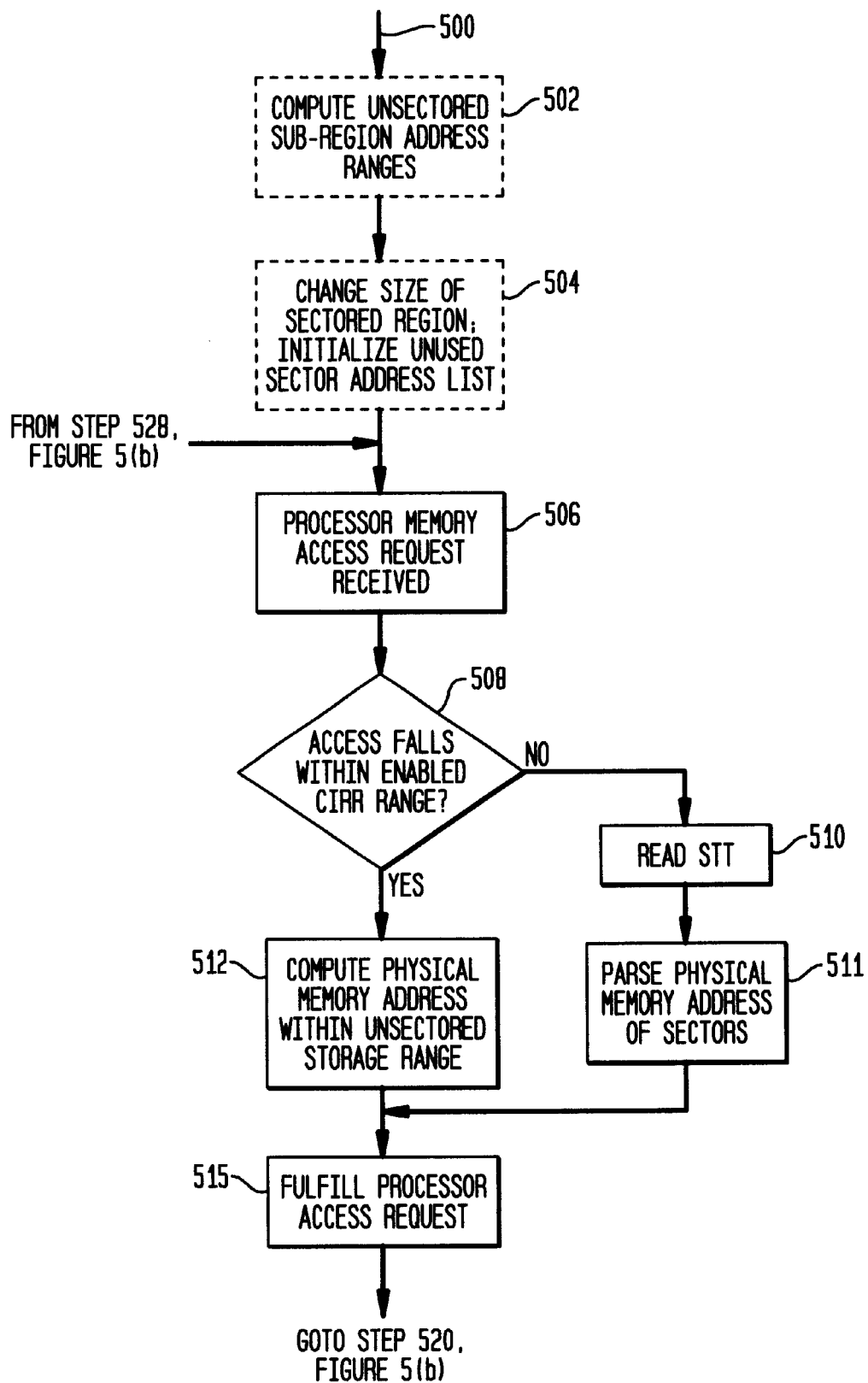
FIGS. 5(a) and 5(b) illustrate the methodology implemented in memory controller hardware for logically partitioning the computer memory according to the invention.
Figure 5B:
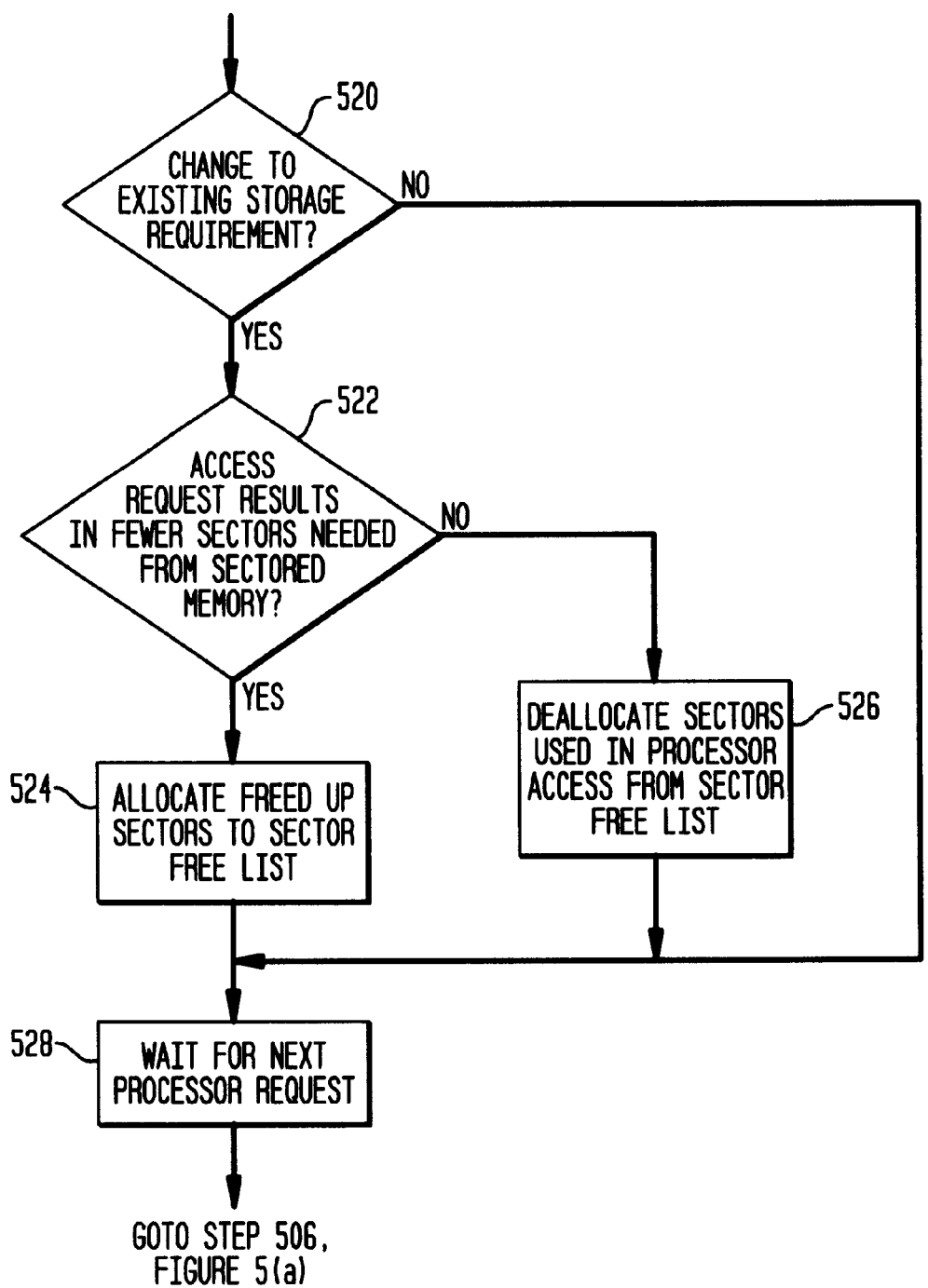

FIGS. 5(a) and 5(b) illustrate a flow chart indicating the sequence 500 for processing memory requests in accordance with the invention. In a preliminary step 502, the range requirements for each unsectored storage sub-region is first calculated and made available in the memory controller (FIG. 1) via the CIRR registers 403. In the preferred embodiment, a user is enabled to configure the system's Physical Memory Configuration Register(s) (not shown) and CIRR registers which set the size of the uncompressed memory partition. Particularly, hardware logic is implemented to define and calculate the size and start address locations of each of the unsectored storage sub-regions 402, as governed according to equations 3)–5). Consequently, in a further preliminary step 504, for every unsectored storage sub-region specified, a total amount of unsectored storage memory is calculated, and the sectored storage region in memory is correspondingly reduced as is the unused sector address list (sector free list) which is initialized to include the address locations of available sectored storage memory, and the address locations of the "holes" in the STT that correspond to each enabled unsectored storage sub-region(s). It is understood that the sector free list may be located in a separate memory, however, is preferably located in a sub-region of the partitioned sectored memory.

At step 506, a processor request is received by the memory controller and, at step 508, the address indicated in the processor request for accessing the main memory is compared to each of the CIRR registers in the memory controller via hardware logic employing a comparator device, for example. When an access falls within an enabled CIRR range, that is, if the enabled bit 406 is set, the memory controller computes the physical memory address to fulfill the access request directly at step 512. This physical memory address is calculated in accordance with equation 6) as follows:

$$\text{physical\_address}(n) = \text{CIRR\_Physical\_address}(n) + \text{real\_address} \quad 6)$$

where the CIRR_Physical_address(n) is calculated in accordance with equation 4) and the real_address which corresponds to the high order processor "real" address bits (normalized in accordance with the subtraction in equation 4). Further to step 508, if the access does not fall within an enabled CIRR range, i.e., enabled bit not set, the access is handled at steps 510 and 511 in the normal manner by locating the physical memory address of the sectors that contain the requested information in the sector translation table (STT). Thus, at step 515 the access request is processed and fulfilled.

FIG. 5(b) illustrates the continuation of the process in FIG. 5(a) with first steps 520, 522 determining whether the access request results in data removal from sectored memory. If the access request results in data removal from sectored memory, the freed up sectors are allocated and added to the sector free list at step 524. If data was added to the sectored memory region, the corresponding sectors used in the access are no longer free, and hence a deallocation is performed at step 526 to remove the free sectors used from the sector free list. The process continues at step 528 so that the next processor request may be performed.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A memory management system for a computer implementing a processing device for enabling indirect storage and retrieval of compressed data in available address space in a physical memory system associated with said computer, said memory management system comprising:

a) a sectored memory region in said physical memory for exclusive storage of compressed data in fixed length storage sectors and having an associated sector translation lookup table (STT) including fixed length entries for mapping said real memory addresses to data storage locations within said physical memory;

b) an unsectored memory region in said physical memory for exclusively storing uncompressed data, said unsectored memory region comprising one or more unsectored memory subregions; and, c) compressed memory control system providing memory resource management for enabling said processing device to directly access said uncompressed data within said unsectored memory region without reference to said sector translation lookup table.

2. The memory management system as claimed in claim 1, wherein said compressed memory control system comprises a programmable range register corresponding to an address range of each respective unsectored memory sub-region within said unsectored memory region for indicating existence of the respective unsectored memory subregion and indicating the address range for said unsectored memory subregion.

3. The memory management system as claimed in claim 2, wherein each said programmable range register comprises:

a first bit vector for storing a base address of said unsectored memory subregion address range at a specific granularity within the physical memory;

a second bit vector for storing an index address of said unsectored memory subregion at a specific granularity within a specific extent from said base address; and, an enable bit indicating the allocation of a corresponding unsectored memory subregion in said unsectored memory region, wherein a set of said programmable range registers is used to define a plurality of independent unsectored memory sub-regions comprising said unsectored memory region.

4. The memory management system as claimed in claim 2, wherein said compressed memory control system further comprises:

comparator device for comparing an address location associated with a processing device access request with the address ranges indicated by each said programmable range register to determine if an access request falls within an enabled unsectored memory subregion; and if enabled, said compressed memory control system computing the physical memory address in said unsectored memory subregion to fulfill the access request.

5. The memory management system as claimed in claim 4, further including: system for dynamically maintaining a sector free list comprising address locations of available sectors in said sectored memory region, and additionally comprising address locations of available sectors in sector translation table entries that correspond to allocated unsectored storage subregions.

6. The memory management system as claimed in claim 5, wherein said sector free list is maintained in memory locations in said sectored storage region.

7. The memory management system as claimed in claim 1, wherein said unsectored storage region, said sectored storage region and said STT are each logically and uniquely partitioned within available address space of said physical memory, each said unsectored storage sub-region accessible according to a fixed address reference location in said physical memory.

8. The memory management system as claimed in claim 1, wherein said fixed address location in said physical memory is a logical top of said physical memory, said unsectored storage region beginning at said logical top of said physical memory and extending towards a logical bottom of said physical memory.

9. The memory management system as claimed in claim 8, wherein said sector translation table begins at the logical bottom of said physical memory and extends toward the logical top of said physical memory.

10. The memory management system as claimed in claim 9, wherein said sectored storage region begins at the end of the sector translation table and extends to the end of the unsectored storage region.

11. The memory management system as claimed in claim 1, further comprising:

a compressor mechanism connected to said sectored storage and unsectored storage regions and said processing device, for compressing processor information into compressed information units for storage in said sectored storage; and, a decompressor mechanism for reversing compressed information units to make said processor information available to said processing device.

12. The memory management system as claimed in claim 1, wherein said one or more unsectored storage sub-regions are concatenated together in said physical memory.

13. In a computer processing system capable of performing read/write memory access to an associated fixed size physical memory system storing compressed data, a method for storing uncompressed data in and accessing uncompressed data from the physical memory comprising the steps of:

a) logically partitioning the fixed size physical memory into a sectored memory region for exclusive storage of storage compressed data in fixed length storage sectors, a sector translation lookup table (STT) including fixed length entries including addresses for mapping locations within said physical memory, and, an unsectored memory region for exclusively storing uncompressed information in one or more sub-regions thereof, and b) in response to a processing system request for memory read/write access, comparing an address specified in said processor request with an address range corresponding to said partitioned unsectored memory region, and directly accessing said uncompressed information within said partitioned unsectored memory region without reference to said sector translation lookup table.

14. The method as claimed in claim 13, wherein said partitioning step further includes the step of:

allocating a size of said unsectored storage region and computing address range requirements for said unsectored storage sub-regions; and, reducing a size of said sectored storage region by a corresponding amount of unsectored storage region specified.

15. The method as claimed in claim 14, wherein said logical partitioning of said memory is configurable by said user prior to a system start.

16. The method as claimed in claim 14, wherein said allocating step further includes the step of setting one or more programmable range register corresponding to each respective unsectored memory subregion for indicating existence of the respective unsectored memory subregion and indicating an address range for said unsectored memory subregion, said comparing step including:

comparing a request address generated by said processing system with address ranges specified in said one or more programmable range registers; and, redirecting said processing system request to the unsectored memory region when it falls within an active subrange.

17. The method as claimed in claim 14, further including the step of dynamically maintaining a sector free list comprising address locations of available sectors in said sectored memory region, and address locations of available sectors in sector translation table entries that correspond to allocated unsectored storage subregions, said processing system utilizing said sector free list to determine available locations for access in said sectored storage region.

18. The method as claimed in claim 17, wherein said dynamically maintaining step further includes the steps of:

adding fixed sector addresses to the sector free list as compressed data is removed from said sectored memory region in response to a processing system request; and, removing free sectors from the sector free list in response to compressed data being added to the sectored memory region.

19. The method as claimed in claim 14, wherein said step of computing address range requirements for said unsectored storage sub-regions includes the step of referencing a start address of each unsectored storage sub-region according to a top address location of said physical memory.

* * * * *